United States Patent
Yeh

(10) Patent No.: US 6,694,442 B2
(45) Date of Patent: Feb. 17, 2004

(54) METHOD FOR SAVING POWER IN A COMPUTER BY IDLING SYSTEM CONTROLLER AND REDUCING FREQUENCY OF HOST CLOCK SIGNAL USED BY SYSTEM CONTROLLER

(75) Inventor: Shih-Ping Yeh, Taipei (TW)

(73) Assignee: AsusTek Computer Inc., Taipei (TW)

( * ) Notice: Subject to any disclaimer, the term of this patent is extended or adjusted under 35 U.S.C. 154(b) by 589 days.

(21) Appl. No.: 09/737,953

(22) Filed: Dec. 18, 2000

(65) Prior Publication Data

US 2002/0078391 A1 Jun. 20, 2002

(51) Int. Cl.[7] .............................. G06F 1/26; G06F 1/04
(52) U.S. Cl. ........................ 713/322; 713/323; 713/600
(58) Field of Search .............................. 713/300, 320, 713/322, 323, 600, 601

(56) References Cited

U.S. PATENT DOCUMENTS

| | | | | |
|---|---|---|---|---|
| 5,218,704 A | * | 6/1993 | Watts et al. ................. | 713/322 |
| 5,490,059 A | * | 2/1996 | Mahalingaiah et al. ........ | 700/46 |
| 5,727,193 A | * | 3/1998 | Takeuchi .................... | 713/501 |
| 5,754,869 A | * | 5/1998 | Holzhammer et al. ...... | 713/300 |
| 5,925,133 A | * | 7/1999 | Buxton et al. .............. | 713/323 |
| 6,367,023 B2 | * | 4/2002 | Kling et al. ................. | 713/340 |
| 6,528,974 B1 | * | 3/2003 | Mirov et al. ................. | 323/267 |
| 6,574,740 B1 | * | 6/2003 | Odaohhara et al. .......... | 713/323 |
| 6,608,476 B1 | * | 8/2003 | Mirov et al. ............. | 324/103 R |

FOREIGN PATENT DOCUMENTS

EP      0770952 A1 *  5/1999

* cited by examiner

Primary Examiner—Thomas Lee
Assistant Examiner—Chun Cao
(74) Attorney, Agent, or Firm—Winston Hsu

(57) ABSTRACT

A computer system has a central processing unit (CPU), a memory, a first power management routine, a second power management routine, a clock generator, an event controller, and a system controller for implementing a bus. The system controller uses a host clock signal that determines the operating frequency of the bus. The clock generator generates the host clock signal. The first power management routine has computer code that saves state information of the computer system in the memory and that places the system controller into an idle state. The second power management routine restores the computer system using the state information stored in the memory. The event controller sends an interrupt to the system controller to cause the CPU to execute the first power management routine, causes the clock generator to change the host clock signal to a new frequency while the system controller is in the idle state, activates the system controller after the host clock signal has changed to the new frequency, and causes the CPU to execute the second power management routine. By changing the host clock signal to the new frequency when the system controller is in the idle state, the event controller prevents the system controller from crashing. By changing the frequency of the host clock signal, the operating frequency of the bus is changed, and by changing the operating frequency of the bus the total power consumption of the computer system is changed.

17 Claims, 3 Drawing Sheets

METHOD FOR SAVING POWER IN A COMPUTER BY IDLING SYSTEM CONTROLLER AND REDUCING FREQUENCY OF HOST CLOCK SIGNAL USED BY SYSTEM CONTROLLER

BACKGROUND OF THE INVENTION

1. Field of the Invention

The present invention relates to a computer system. More specifically, the present invention discloses a power saving method and system for a portable computer.

2. Description of the Prior Art

Portable computing is an increasingly popular option for users. This ubiquity of notebook computers presaged consumer demand for extending the operational battery life of these portable systems, either through improved battery technology or more energy-efficient components.

A rather heavy-handed method used to extend battery time on a portable computer includes a sleep mode. Under this method, after a certain amount of time has passed during which the user has not used the computer system, the central processing unit (CPU) saves the state of the computer into memory and then goes into a suspend state that consumes relatively little power. In this suspend state, the display is turned off, the disk drive spins down and the system bus enters an idle state with the dynamic random access memory (DRAM) placed in a self-refresh mode. An external interrupt, such as from a pointing device or keyboard, "wakes up" the computer, bringing both the bus and the DRAM back online, and pulling the CPU out of the suspend state. The CPU then turns on the display, spins up the hard drive and restores its prior state, resuming execution of the process it had left off when it entered into the sleep state.

The CPU has been targeted by manufacturers as a primary consumer of battery power, and the manufacturers of CPUs have thus come up with certain methods to reduce the power usage of the CPU. With certain CPUs, it is now possible to adjust the operating clock frequency by changing an internal multiplier of a phase-locked loop (PLL) circuit within the CPU, and it is also possible to change the operating voltage of the CPU. When the CPU runs at slower clock speeds, or at lower voltages, it requires less power. For many of the most common applications, a CPU running at a reduced speed is usually sufficiently fast to not incur any inconvenience for the user.

However, the CPU is only one of many components within the portable computer. The system bus, DRAM and video chipset all also consume power. If the operating speeds of these components could be reduced when the internal operating frequency of the CPU is reduced, additional power would be saved. However, with current personal computer systems, changing the operating frequency of these components is not supported as abrupt changes to the bus clock could lead to crashing of the CPU, the video chipset or the chipset that implements the system bus.

SUMMARY OF THE INVENTION

It is therefore a primary objective of this invention to provide a system and method for a computer system that enables changing the operating frequency of a bus within the computer system to reduce power used by components on the bus.

The present invention, briefly summarized, discloses a method and system for managing power consumption in a computer. The computer has a system controller for implementing a bus, a central processing unit (CPU), a memory, a first power management routine, a second power management routine, a clock generator, and an event controller. The system controller uses a host clock signal that determines the operating frequency of the bus. The clock generator generates the host clock signal. The first power management routine has computer code that saves state information of the computer system in the memory and that places the system controller into an idle state. The second power management routine restores the computer system using the state information stored in the memory. The event controller is used to implement the method of the present invention. The event controller sends an interrupt to the system controller to cause the CPU to execute the first power management routine, which then saves the state of the CPU and system controller in a reserved space in memory, and which then places the system controller and the CPU into an idle state. The event controller programs the clock generator to change the host clock to a new frequency, then activates the CPU and system controller after the host clock signal has changed to the new frequency, and causes the CPU to execute the second power management routine. By changing the host clock signal to the new frequency when the system controller and CPU are in their respective idle states, the event controller prevents the system controller and CPU from crashing. By changing the frequency of the host clock, the operating frequency of the bus is changed, and by changing the operating frequency of the bus the total power consumption of the computer system, which includes the CPU, memory, system controller and VGA, is changed.

It is an advantage of the present invention that the event controller can change the operating frequency of all the components within the computer system while the components are in an idle state. This prevents the components from crashing due to an abruptly changing timing signal. With the components running at a lower frequency, the computer system will consume less power. Alternatively, with the components running at full speed, the full processing power of the computer system is restored. Also, if the components permit it, the event controller may reduce the core voltage of the components when they run at the lower frequency, further reducing the individual power needs of the components.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
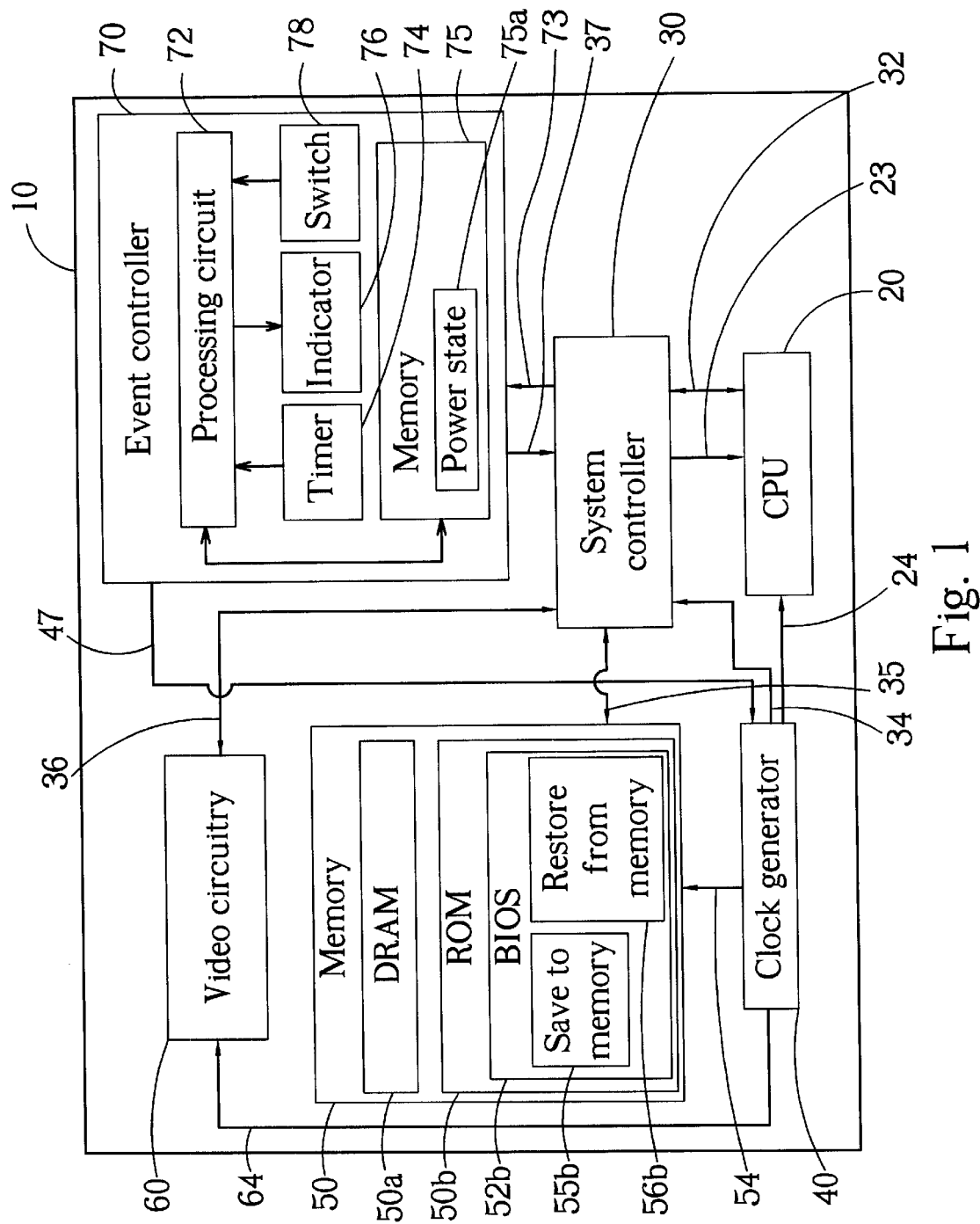
FIG. 1 is a function block diagram of a computer system according to the present invention.

Please refer to FIG. 1. FIG. 1 is a function block diagram of a computer system 10 according to the present invention. In a preferred embodiment of the present invention, the computer system 10 is a portable computer. The computer system 10 utilizes the power saving method of the present invention, and comprises the following components: a central processing unit (CPU) 20, a system controller 30, a clock generator 40, a memory 50, video circuitry 60 and an event controller 70. The system controller implements the various buses within the computer system 10, such as a front side bus 32 for the CPU 20, a memory bus 35 for the memory 50, and a video bus 36 for the video circuitry 60. These buses 32, 35 and 36 enable the components 20, 50 and 60 to communicate with each other, using the system controller 30 as an intermediary. The system controller 30 is generally in the form of a commercially available chipset that is specifically designed for the CPU 20.

The clock generator 40 is used to generate the various timing signals for the various components within the computer system 10, such as a CPU clock signal 24, a memory clock signal 54, a host clock signal 34, and a video clock signal 64. The CPU clock signal 24 determines the internal operating frequency of the CPU 20. The greater the frequency of the CPU clock signal 24, the greater the number of instructions cycles executed by the CPU 20 per second. This, however, also leads to greater power consumption of the CPU 20. Conversely, if the frequency of the CPU clock signal 24 is reduced, the CPU 20 will execute fewer instruction cycles per second, but the CPU 20 will also consume less power. In a similar manner, the memory clock signal 54 controls the speed and power consumption of the memory 50, the video clock signal 64 controls the speed and power consumption of the video circuitry 60, and the host clock signal 34 determines the operating speed and resultant power consumption of the system controller 30. As the system controller 30 is used to implement the buses 32, 35 and 36, changing the frequency of the host clock signal 34 will result in a change of the operating frequency of the buses 32, 35 and 36. Slowing the host clock signal 34 will result in slower buses 32, 35 and 36, and thus reduce the processing power of the computer system 10, while also reducing the total power consumption of the computer system 10. Increasing the frequency of the host clock signal 34 will result in more processing power from the computer system 10, and an increase in the total power consumption of the computer system 10.

The memory 50 comprises dynamic random access memory (DRAM) 50a and read only memory (ROM) 50b. The DRAM 50a has a normal mode of operation in which it accepts read and write operations from the bus 35, and must be periodically refreshed to retain the integrity of its contents. The DRAM 50a also has a self-refresh mode of operation in which it is essentially idle, but in which it also refreshes itself so that its contents are not lost. The ROM 50b is used to permanently hold power management service routines for the system 10, and includes a basic input/output system (BIOS) 52b. The BIOS 52b includes save to memory computer code 55b and restore from memory computer code 56b. The save to memory code 55b, when executed by the CPU 20, causes the CPU 20 to save its current state and the state of the system controller 30 and video circuitry 60 into the DRAM 50a, and instructs the system controller 30 to perform a power on suspend operation. The system controller 30 then causes the CPU 20 to enter into a suspend state, the DRAM 50a to enter into the self-refresh mode of operation, and the video circuitry 60 to idle. The system controller 30 then enters into an idle state. In the suspend state the operational state of the CPU 20 is essentially turned off, with the CPU 20 performing no instruction cycles and consuming very little power. Similarly, in idle states both the video circuitry 60 and the system controller 30 are basically turned off and inactive, consuming very little power and simply waiting for a "wake up" signal. The restore from memory code 56b, when executed by the CPU 20, uses the data previously stored in the DRAM 50a during execution of the save to memory procedure 55b to restore a prior state of the CPU 20, the video circuitry 60 and the system controller 30. The CPU 20 thus resumes execution of any task left off prior to running the save to memory code 55b. The save to memory 55b and restore from memory 56b routines may save and restore more than just the state of the CPU 20, the system controller 30 and the video circuitry 60. The state of other components may also be saved, if required. In short, these two routines save and restore whatever state information of the computer system 10 is required to properly suspend and then resume execution of tasks run by the computer system 10. The functionality of the save to memory 55b and restore from memory 56b routines are well known in the art.

The event controller 70 is used to implement the method of the present invention, and comprises a processing circuit 72, a timer 74, a state indicator 76 and a switch 78. The processing circuit 72 is used to perform the various tasks required to perform the power saving method of the present invention, which are elaborated upon below. The processing circuit 72 could be implemented as a programmable logic array (PLA), a micro-controller or even as a relatively simple processor, such as an 8051. A memory 75 is used to store program code and to hold program data for the processing circuit 72, such as a power state variable 75a, which is used to recall the current power saving state of the computer system 10. The timer 74 provides the timing signals necessary to run the processing circuit 72. In this manner, the processing circuit 72 runs independently of the clock generator 40. The state indicator 76 is used to indicate to the user the current power saving state of the computer system 10, and could be, for example, a light emitting diode (LED). If the state indicator 76 is lit, for example, then it may indicate that the computer system 10 is running in a power saving mode, using reduced timing frequencies from the clock generator 40. On the other hand, if the state indicator 76 is turned off, then it may indicate that the computer system 10 is at full processing potential, using maximum clock frequencies from the clock generator 40. The event controller 70 controls the indicative state of the state indicator 76. Finally, the switch 78 is used by the user to toggle the power saving state of the computer system 10.

Figure 2:
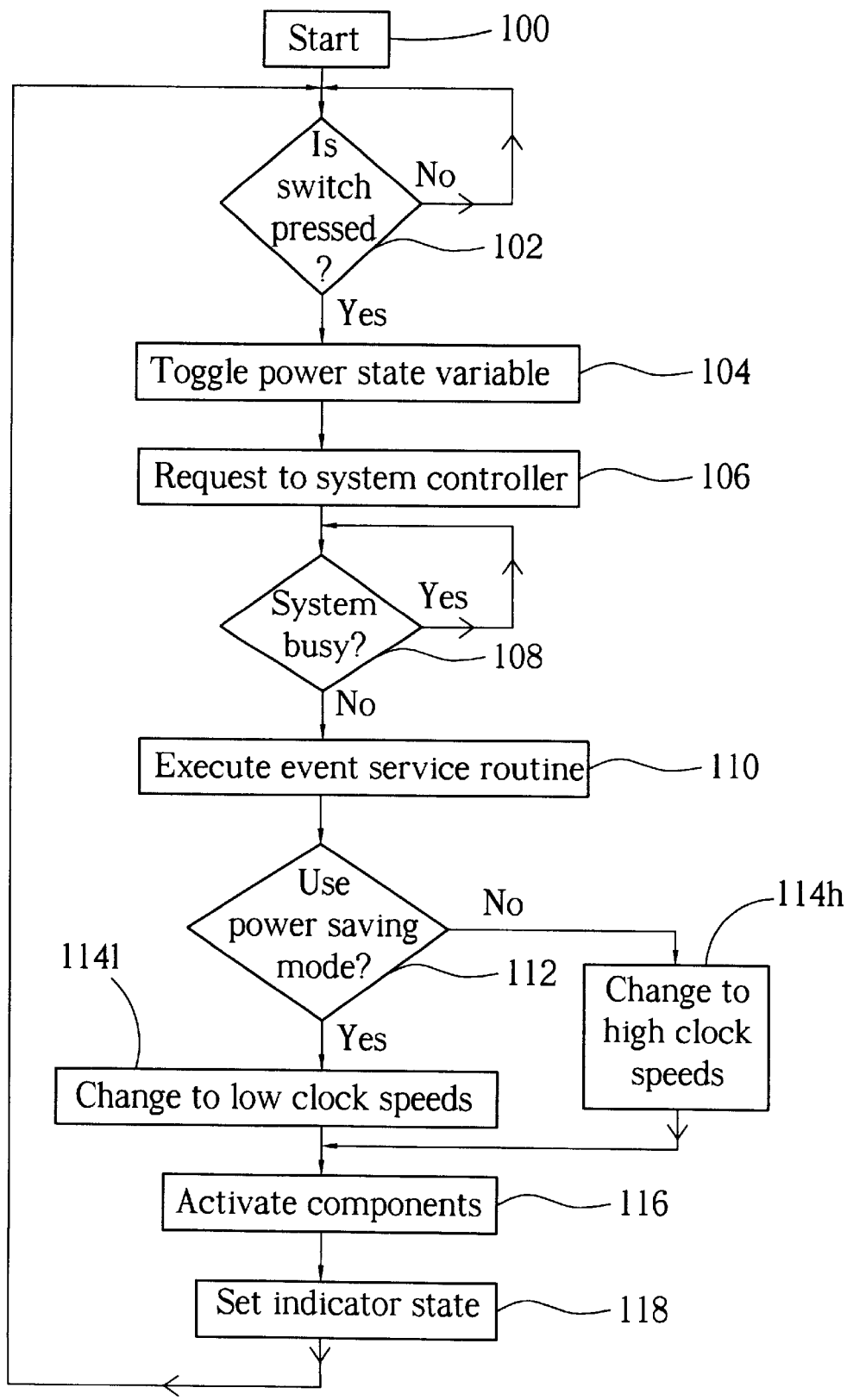
FIG. 2 is a flow chart for the computer system of FIG. 1.

Please refer to FIG. 2 in conjunction with FIG. 1. FIG. 2 is a flow chart for the computer system 10. As noted above, the system controller is used to implement the power saving method of the present invention, which includes the following steps:

100: Start. The computer system 10 is turned on. Set the power state variable 75a to an initial condition, such as OFF. Set indicator 76 according to power state variable 75a. Clock generator 40 uses maximum frequencies for clock signals 24, 34 and 64. DRAM is in a normal state, and all components 20, 30 and 60 are active. Proceed to step 102.

102: The processing circuit 72 waits for a switch-pressing signal from the switch 78. When the switch-pressing signal is received, proceed to step 104.

104: Toggle the value of the power state variable 75a, i.e., power state variable 75a=NOT(power state variable 75a). Proceed to step 106.

106: The event controller 70 sends an interrupt request 37 to the system controller 30. This is a system control interrupt (SCI), and thus has a very low priority. Proceed to step 108.

108: As the SCI 37 has a low priority, the system controller 30 continues to service other pending interrupts until the system is no longer busy. At this point, the event controller 70 is simply waiting for a suspend signal 73 from the system controller 30, which indicates that the system controller 30 has completed the power on suspend routine. When the system is no longer busy, go to step 110.

110: The system controller 30 sends an interrupt request 23 to the CPU 20. CPU interrupt request 23 is a system management interrupt (SMI), and is quickly processed by the CPU 20. The SMI 23 causes the CPU 20 to execute the save to memory code 55b. Consequently, the status of the CPU 20, the video circuitry 60 and system controller 30 is saved into the DRAM 50a. The system controller 30 causes the video circuitry 60 to enter into the idle state, the DRAM 50a to enter into the self-refresh mode and the CPU 20 to enter into the suspend state. The suspend signal 73 becomes TRUE, informing the event controller 70 that the power on suspend routine has finished. The event controller 70 then causes the system controller 30 to idle. Proceed to step 112.

112: Is the power state variable 75a indicating that the power saving mode should be used? If so, go to step 114l. Otherwise, go to 114h.

114l: The power saving method is to be used. The event controller 70 uses a clock control signal 47 to set the clock signals 24, 34, 54 and 64 to lower frequencies. For example, if the clock generator 40 is currently set to generate a 133 MHz signal for the memory clock signal 54 and for the host clock signal 34, the event controller 70 may use the clock control signal 47 to cause the clock generator 40 to generate an 60 MHz signal for the clock signals 24, 34, and 54. These lower clock signals 24, 34, and 54 will result in a reduction of the total power consumption of the computer system 10. Notably, reducing the frequency of the host clock signal 34 will cause a corresponding reduction of the operating frequencies of the front side bus 32, the memory bus 35 and the video bus 36. Note that the event controller 70 may choose to adjust only one, some or all of the clock signals 24, 34, 54 and 64. Exactly how the event controller 70 changes the clock signals 24, 34, 54 and 64 will depend upon the hardware capabilities and restrictions of the components 20, 30, 40, 50 and 60. As the CPU 20 is suspended, and both the video circuitry 60 and the system controller 30 are idle, these components will not crash when their respective clock signals 24, 64 and 34 are changed. Also, the clock signal 54 of the DRAM 50a can be safely changed as the DRAM 50a is in the self-refresh mode. Go to step 116.

114h: Maximum computing power is to be used. Turn the power saving method off. The event controller 70 uses the clock control signal 47 to set the clock signals 24, 34, 54, and 64 to their highest possible respective frequencies. Go to step 116.

116: The event controller 70 pulls the system controller 30 out of the idle state by way of the interrupt request 37. The system controller 30 performs a restore from suspend routine, returning the DRAM 50a back to the normal mode of operation, wakes up the video circuitry 60, and brings the CPU 20 out of the suspend state. When pulled from the suspend state, the CPU 20 executes the restore from memory code 56b. The computer system 10 is thus restored back to the state it had prior to step 106, except that it is running at either a reduced or an increased speed. Proceed to step 118.

118: Use the power state variable 75a to set the state of the indicator 76 appropriately. Go to step 102.

Figure 3:
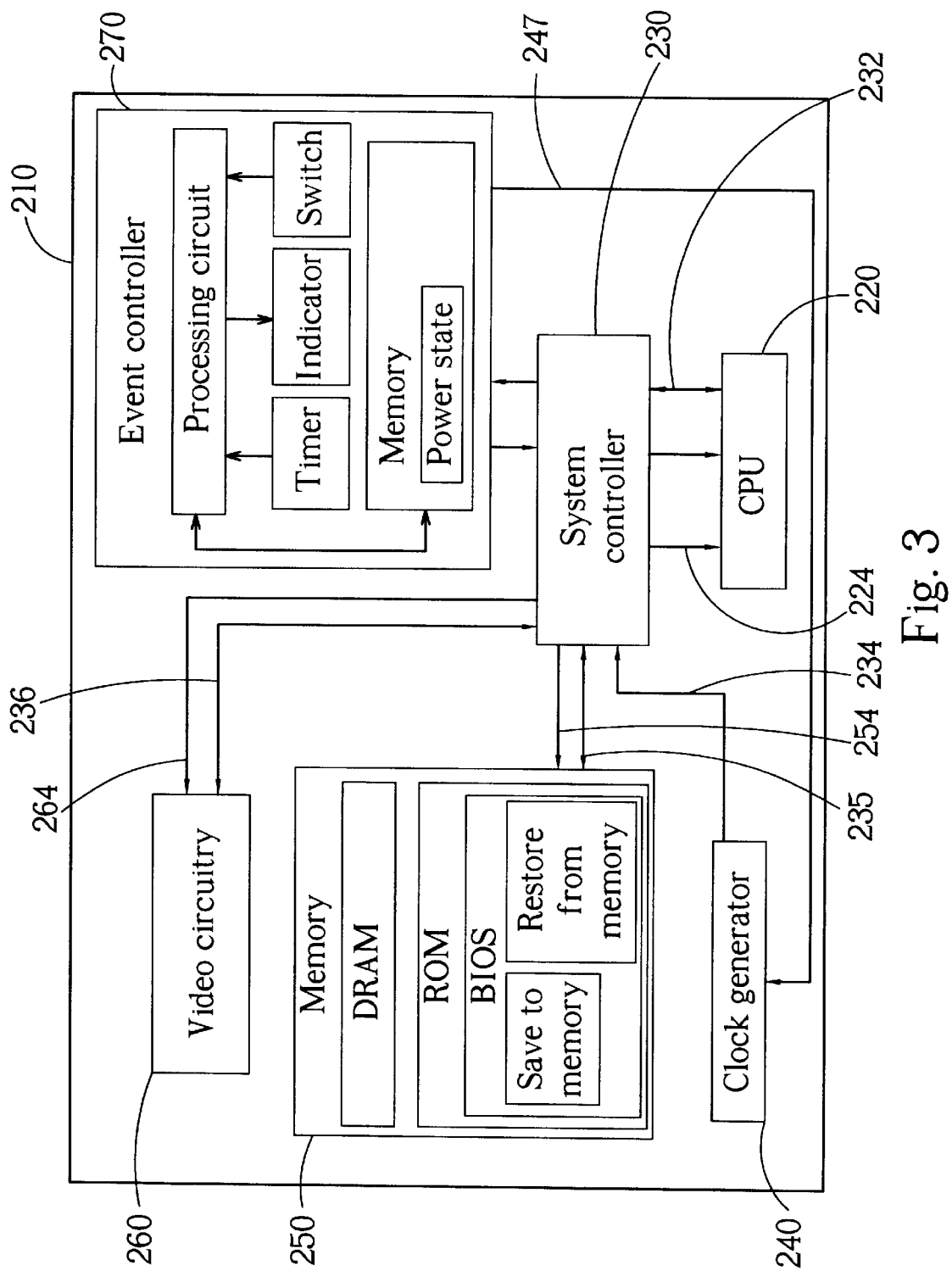
FIG. 3 is a function block diagram of a second computer system according to the present invention.

The design shown in FIG. 1 is for a system that supports asynchronous timing signals between the system controller 30 and the CPU 20, the memory 50, the video circuitry 60. In such a system, it is theoretically possible for all of the various components to run at different frequencies. Hence, the design depicted in FIG. 1 is for the most general case. In practice, though, it is usually easier to have a synchronous design. This synchronous design is shown in FIG. 3. FIG. 3 is a function block diagram of a second computer system 210 according to the present invention. In nearly all functional aspects, the computer system 210 of FIG. 3 is identical to that of the computer system 10 of FIG. 1 except that the clock generator 240 generates only a host clock signal 234 for the system controller 230. The system controller 230 then uses the host clock signal 234 to generate a CPU clock signal 224 for the CPU 220, a memory clock signal 254 for the memory 250, and a video clock signal 264 for the video circuitry 260. The event controller 270 uses the clock control signal 247 to adjust only the frequency of the host clock signal 234. Changing the frequency of the host clock signal 234 will change not only the operating frequencies of the front side bus 232, the memory bus 235 and the video bus 236, but will also change the internal operating frequencies of the CPU 220, the memory 250 and the video circuitry 260.

The above discussion has been with reference to portable computer systems only. However, it should be clear to those skilled in the art that the system and method of the present invention could just as easily be applied to desktop computer systems. Indeed, it could be applied to any type of computational system that requires changing the operating frequency of a bus or component within the system to conserve power without resulting in the system crashing. Furthermore, if the components within the system permit it, the event controller 70, 270 of the present invention could also be used to cause the operational core voltages within the components of the system to be raised or lowered to further manage the power consumption of the system.

In contrast to the prior art, the present invention provides a unique event controller within the computer system. This event controller has its own timer, and so is able to change the clock signals generated by the clock generator without affecting itself. The event controller waits for the CPU and supporting chipsets to enter an idle state, with the DRAM in a self-refresh mode. The event controller then changes the timing of the clock signal to the CPU and chipsets to adjust power demands of these components. As the components are idle, they will not crash when the frequency of their timing signals is changed. The event controller then causes the CPU and chipsets to activate, and the computer resumes running where it had left off. The entire process is almost instantaneous, as far as a user is concerned, and so is convenient to use.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for saving power in a computer system, the computer system comprising:
   a central processing unit (CPU);
   a system controller for implementing a bus for the computer system, the CPU electrically connected to the bus, the system controller using a host clock signal having a first frequency;

a memory for storing data, the memory electrically connected to the bus; and a clock generator for generating the host clock signal, the clock generator electrically connected to the system controller;

the method comprising:

saving state information of the computer system in the memory;

idling the system controller;

causing the clock generator to change the host clock signal to a second frequency when the system controller is idle, the second frequency being lower than the first frequency;

activating the system controller; and restoring the state of the computer system from the saved state information in the memory;

wherein changing the host clock signal to the second frequency causes the system controller to run at a lower frequency, power is saved by running the system controller at the lower frequency, and idling the system controller prior to changing the host clock signal to the second frequency prevents crashing the system controller.

2. The method of claim 1 wherein causing the system controller to run at the lower frequency causes the bus to run at a lower operating frequency, and power is saved by causing the bus to run at the lower operating frequency.

3. The method of claim 1 further comprising:

idling the CPU prior to causing the clock generator to change the host clock signal to the second frequency; and activating the CPU after the clock generator has changed the host clock signal to the second frequency;

wherein idling the CPU prior to changing the host clock signal to the second frequency prevents crashing the CPU.

4. The method of claim 3 wherein the bus comprises a front side bus, the CPU electrically connected to the front side bus, the CPU using a CPU clock signal having a third frequency, the clock generator generating the CPU clock signal, and prior to activating the CPU, the clock generator changes the frequency of the CPU clock signal to a fourth frequency, the fourth frequency being lower than the third frequency; wherein idling the CPU prior to changing the frequency of the CPU clock signal prevents crashing the CPU, and power is saved by using a lower frequency for the CPU clock signal.

5. The method of claim 1 wherein the bus comprises a memory bus, the memory electrically connected to the memory bus, the memory using a memory clock signal having a fifth frequency, the clock generator generating the memory clock signal, and prior to activating the system controller, the clock generator changes the frequency of the memory clock signal to a sixth frequency, the sixth frequency being lower than the fifth frequency; wherein power is saved by using a lower frequency for the memory clock signal.

6. The method of claim 5 wherein the memory is dynamic random access memory (DRAM), and the method further comprises:

placing the DRAM into a self-refresh mode before the clock generator changes the memory clock signal to the sixth frequency; and restoring the DRAM back to a normal mode of operation after the clock generator has changed the memory clock signal to the sixth frequency.

7. The method of claim 1 wherein the computer system further comprises video circuitry, and the bus comprises a video bus, the video circuitry connected to the system controller by the video bus, the video circuitry using a video clock signal having a seventh frequency, the clock generator generating the video clock signal, and prior to activating the system controller, the clock generator changes the frequency of the video clock signal to an eighth frequency, the eighth frequency being lower than the seventh frequency; wherein power is saved by using a lower frequency for the video clock signal.

8. The method of claim 7 further comprising:

idling the video circuitry prior to causing the clock generator to change the video clock signal to the eighth frequency; and activating the video circuitry after the clock generator has changed the video clock signal to the eighth frequency;

wherein idling the video circuitry prior to changing the frequency of the video clock signal prevents crashing the video circuitry.

9. A computer system with a power managing system comprising:

a system controller for implementing a bus of the computer system, the system controller using a host clock signal having a first frequency;

a central processing unit (CPU) electrically connected to the bus;

a memory for storing data, the memory electrically connected to the bus;

a first power management routine stored in the memory, the first power management routine comprising computer code that performs the following steps:

saving state information of the computer system in the memory; and causes the system controller to enter into an idle state;

a second power management routine stored in the memory, the second power management routine comprising computer code that restores a state of the computer system using the state information stored in the memory;

a clock generator for generating the host clock signal, the clock generator electrically connected to the system controller; and an event controller electrically connected to the system controller and to the clock generator, the event controller performing the following functions:

sending a first interrupt to the system controller to cause the CPU to execute the first power management routine;

causing the clock generator to change the host clock signal to a second frequency when the system controller is in the idle state; and activating the system controller after the host clock signal is changed to the second frequency; and causing the CPU to execute the second power management routine;

wherein by changing the host clock signal to the second frequency when the system controller is in the idle state, the event controller prevents the system controller from crashing;

wherein by changing the frequency of the host clock signal, an operating frequency of the system controller is changed, and by changing the operating frequency of the system controller the total power consumption of the computer system is changed.

10. The computer system of claim 9 wherein changing the operating frequency of the system controller changes an operating frequency of the bus, and by changing the operating frequency of the bus the total power consumption of the computer system is changed.

11. The computer system of claim 10 wherein the first power management routine further comprises computer code for placing the CPU into a suspended state, and the event controller causes the CPU to activate after the host clock signal is changed to the second frequency; wherein by changing the host clock signal to the second frequency when the CPU is in the suspended state, the event controller prevents the CPU from crashing.

12. The computer system of claim 11 wherein the bus comprises a front side bus, the CPU electrically connected to the front side bus, the CPU using a CPU clock signal having a third frequency, the CPU clock signal determining an internal operating frequency of the CPU, the clock generator generating the CPU clock signal, and prior to activating the CPU, the event controller causes the clock generator to change the frequency of the CPU clock signal to a fourth frequency; wherein placing the CPU into a suspended state prior to changing the frequency of the CPU clock signal prevents crashing the CPU, and changing the internal operating frequency of the CPU changes the total power consumption of the CPU.

13. The computer system of claim 10 wherein the bus comprises a memory bus, the memory electrically connected to the memory bus, the memory using a memory clock signal having a fifth frequency, the clock generator generating the memory clock signal, and prior to activating the system controller, the event controller causes the clock generator to change the frequency of the memory clock signal to a sixth frequency; wherein changing the frequency of the memory clock signal changes the total power consumption of the memory.

14. The computer system of claim 13 wherein the memory comprises dynamic random access memory (DRAM), the first power management routine further comprises computer code for causing the DRAM to enter into a self-refresh mode, and the event controller causes the DRAM to return back to a normal mode of operation after changing the memory clock signal to the sixth frequency.

15. The computer system of claim 10 wherein the computer system further comprises video circuitry, and the bus comprises a video bus, the video circuitry connected to the system controller by the video bus, the video circuitry using a video clock signal having a seventh frequency, the clock generator generating the video clock signal, and prior to activating the system controller, the event controller causes the clock generator to change the frequency of the video clock signal to an eighth frequency; wherein changing the frequency of the video clock signal changes the total power consumption of the video circuitry.

16. The computer system of claim 15 wherein the first power management routine further comprises computer code for causing the video circuitry to enter into an idle mode, and the event controller causes the video circuitry to activate after the video clock signal is changed to the eighth frequency; wherein by changing the video clock signal to the eighth frequency when the video circuitry is in the idle mode, the event controller prevents the video circuitry from crashing.

17. The computer system of claim 10 wherein the event controller comprises a processing circuit, and a timer, the timer providing a timing signal for the processing circuit.

\* \* \* \* \*